United States Patent
Shibata

(10) Patent No.: US 10,154,674 B2
(45) Date of Patent: *Dec. 18, 2018

(54) SOLID MILK AND METHOD OF MAKING THE SAME

(71) Applicant: Meiji Co., Ltd., Tokyo (JP)

(72) Inventor: Mitsuho Shibata, Tokyo (JP)

(73) Assignee: Meiji Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,886

(22) Filed: Mar. 21, 2017

(65) Prior Publication Data

US 2017/0188598 A1    Jul. 6, 2017

Related U.S. Application Data

(63) Continuation of application No. 12/158,180, filed as application No. PCT/JP2006/326394 on Dec. 27, 2006, now Pat. No. 9,635,869.

(30) Foreign Application Priority Data

Dec. 28, 2005 (JP) .................................. 2005-379014

(51) Int. Cl.
  *A23C 9/18* (2006.01)
  *A23P 10/28* (2016.01)
  *A23P 30/10* (2016.01)

(52) U.S. Cl.
  CPC ............... *A23C 9/18* (2013.01); *A23P 10/28* (2016.08); *A23P 30/10* (2016.08); *A23V 2002/00* (2013.01)

(58) Field of Classification Search
  CPC .................................. A23C 9/18; A23P 10/28
  See application file for complete search history.

(56) References Cited

U.S. PATENT DOCUMENTS 3,773,519 A * 11/1973 Pisecky .................... A23C 1/04
                                                        426/302

* cited by examiner

*Primary Examiner* — Katherine D LeBlanc
(74) *Attorney, Agent, or Firm* — Osha Liang LLP

(57) ABSTRACT

The present invention is based on knowledge that basically, solid milk provided with both of adequate strength and solubility can be obtained by using only powdered milk as ingredient to be provided with compression molding under state where the porosity and the free fat is controlled within predetermined ranges, and then humidified and dried. Namely, solid milk having porosity of 30%-60%, and method of making solid milk including: a compression step for compressing powdered milk to obtain a solid form of compressed powdered milk; a humidifying step for humidifying the compressed powdered milk obtained by the compression step; and a drying step for drying the compressed powdered milk humidified by the humidifying step achieves the object of providing solid milk having preferred solubility and strength, and method of making the same.

7 Claims, 6 Drawing Sheets

SOLID MILK AND METHOD OF MAKING THE SAME

CROSS-REFERENCE TO RELATED APPLICATIONS

This application is a continuation of U.S. patent application Ser. No. 12/158,180, filed on Jun. 19, 2008, which is a National Stage of International Application No. PCT/JP2006/326394, filed on Dec. 27, 2006, which claims priority to JP2005-379014 filed on Dec. 28, 2015. The contents of the priority applications are incorporated by reference in their entirety.

BACKGROUND OF THE INVENTION

Field of the Invention

The present invention relates to solid milk to be dissolved in heated water for drinking, and method of making the same. More specifically, the present invention relates to solid milk having preferred solubility and strength.

Description of the Related Art

Powdered milk is food product whose shelf life is improved by removing almost all of the necessary moisture for the microbial growth from bovine milk and the like. Since the capacity and weight decrease by removing moisture, the powdered milk can be easily transported. Thus, the powdered milk has advantages in shelf life and transportation. The powdered milk has interspaces between milk powders, and the porosity of the milk powder is generally 60%-70%, so that it readily dissolves in heated water. However, the powdered milk requires measurement of proper quantity every time it is dissolved in heated water or the like. Also, upon measurement of the powdered milk or upon taking out the powdered milk, the powdered milk may spread. Therefore, solid milk that is the powdered milk made into solid state has been proposed (Japanese Utility Model Application Laid-Open Publication No. SHO49-130189 (see patent document 1 below), and Japanese Utility Model Application Laid-Open Publication No. SHO61-118280 (see patent document 2 below). However, it has not been easy to actually make the powdered milk into solid state and satisfy both of the strength and the solubility. Namely, even if the powdered milk is made into solid state, it has been easy to break and has been hard to handle. Moreover, the solid milk has smaller surface area compared to the powdered milk, so that it has been less soluble in the heated water.

When the powdered milk is actually pressured to be made into solid state, since the powdered milk is an emulsified substance, the emulsified state is destroyed by the pressure. Then the fat called "free fat" oozes from the powdered milk. The free fat readily oxidizes and destroys flavor of the powdered milk. Also, when the powdered milk is dissolved in the heated water, there is problem that excessive free fat floats on the water and aggregates. (This phenomenon is called "oil off".) On the other hand, the Japanese Examined Patent Application Publication No. SHO49-4948 (see patent document 3 below) discloses "aggregated powdered milk". The point that "the aggregated powdered milk is easily immersed and thus easily disintegrated when thrown into heated water to be dispersed and dissolved" is disclosed. However, the "aggregated powdered milk" in the publication is a mixture with sugar or glucose, so that it is "suitable for use in addition to coffee, tea, or the like". Namely, the basic ingredient of the aggregated powdered milk is not only the powdered milk and it is not substituted for breast milk to be given to infants. The Japanese Examined Patent Application Publication No. SHO49-4948, considers the problems of the free fat and the like when only the powdered milk is used as the basic ingredient, thereby using the mixture of granulated powdered milk and sugar or glucose to make "aggregated powdered milk". The powdered milk in a granulated state has a larger surface area compared to that in the solid state, so that its solubility is high even if the porosity of the granule itself is small.

The Japanese Examined Patent Application Publication No. SHO45-39018 (see patent document 4 below) discloses a technology similar to that of the above-mentioned Japanese Examined Patent Application Publication No. SHO49-4948. Namely, it is disclosed that in order to achieve readily soluble solid milk, the volume of interstice may be enlarged, and that there is problem of the free fat upon making the powdered milk into solid state. However, in the same document, since "there is a limit to the enlargement of a single particle of powdered milk" (column 2, line 30 of the same document), "the powdered milk is attached to sugar group for granulation and then molded and dried", whereby "readily soluble solid milk with less free fat" is obtained (column 3, lines 13-15 of the same document). Namely, in the same document it is mentioned that the solid milk with only the powdered milk made into solid state cannot be obtained. Moreover, the solid milk described in the reference is obtained by attaching the sugar group to the powdered milk, so that the sugar group as a center core exists and the porosity is reduced. Also, the compositionally-homogeneous solid milk cannot be obtained.

The Japanese Examined Patent Application Publication No. SHO53-59066 discloses "solid milk tablet". This solid milk tablet is a tablet of a high density having its fat component leached out on the surface and blocked from external air by the coating of the fat. Since high density tablet is desirable as the solid milk of the same document, its porosity is low.

Japanese patent No. 3044635 discloses "frozen milk". The frozen milk includes a lot of water molecules, so that there is almost no air space.

Also, in the field of food product such as soup, solid food products to be dissolved by pouring hot water are known (Japanese Patent Application Laid-Open Publication No. HEI11-127823, Japanese Patent Application Laid-Open Publication No. 2004-49220, and Japanese Patent Application Laid-Open Publication No. 2004-49221) to which disintegrant is generally added. Also, since ingredients thereof are not the powdered milk, there is no problem such as free fat that is specific to the powdered milk. Namely, although the solid soup and the like are known, solid milk cannot be obtained by merely diverting these technologies in making the solid milk since the powdered milk that is the basic ingredient of the solid milk include a lot of fat.

Also, in the field of medicine, various "intraoral fast disintegrable tablets" readily soluble in the mouth have been developed (e.g. Japanese Patent Application Laid-Open Publication No. HE15-271054, Japanese Patent Application Laid-Open Publication No. HE18-291051, Japanese Patent Application Laid-Open Publication No. HE109-048726, Japanese Patent Application Laid-Open Publication No. 2000-95674, Japanese Patent Application Laid-Open Publication No. 2000-44463, Japanese Patent Application Laid-Open Publication No. 2001-89398, Japanese Patent Application Laid-Open Publication No. 2004-049220, and Japanese Patent No. 2650493). However, composition of medicine in general has a small rate in weight occupied by an active substance, so that a lot of additives such as vehicle other than the active substance can be blended, and the component design is relatively easy. Therefore, medicine, in general has a high strength, and needless to control its solubility by controlling the porosity. Also, medicine does not include a lot of fat as the powdered milk. Therefore, "fast disintegrable" technology in the "intraoral fast disintegrable tablet" cannot be diverted as is to the solid milk. Also, "intraoral fast disintegrable tablet" needs to dissolve rapidly by minimal water in the oral cavity. On the other hand, the solid milk is generally dissolved in heated water for drinking, but not taken directly into the mouth, so that fast solubility is not required as much as the "intraoral fast disintegrable tablet".

[Patent document 1] Japanese Utility Model Application Laid-Open Publication No. SHO49-130189

[Patent document 2] Japanese Patent Application Laid-Open Publication No. SHO61-118280

[Patent document 3] Japanese Examined Patent Application Publication No. SHO49-4948

[Patent document 4] Japanese Examined Patent Application Publication No. SHO45-39018

SUMMARY OF THE INVENTION

An object of the present invention is to provide solid milk having a preferred solubility and strength, and method of making the same.

Another object of the present invention is to provide solid milk that is easy to handle in transportation and easy to measure, and method of making the same.

Another object of the present invention is to provide solid milk having small degradation of flavor and time degradation such as oil off caused by free fat, and method of making the same.

Another object of the present invention is to provide solid milk whose component composition is controllable with only nutritional component, and method of making the same. Specifically, an object of the present invention is to provide solid milk having preferred solubility and strength without adding additives, and method of making the same.

Another object of the present invention is to provide method of making solid milk from powdered milk as is without adding additives such as lubricant.

Another object of the present invention is to provide method of making solid milk which can avoid situation where the powdered milk is attached to a pestle and a mortar of a compression molding machine in a manufacturing process.

Another object of the present invention is to provide method of making powdered milk and solid milk which can make not only the powdered milk but also the solid milk based on the powdered milk after making the powdered milk.

The present invention is based on knowledge that basically, solid milk provided with both of adequate strength and solubility can be obtained by using only powdered milk as ingredient to be provided with compression molding under a state where the porosity and the free fat is controlled within predetermined ranges, and then humidified and dried. At least one of the above-mentioned objects can be solved by the following solid milk and the method of making the same.

[1] One aspect of solid milk of the present invention is solid milk having porosity of 30%-60%. As described above, proposals for making solid milk have been made since around the late forty's of the Showa era. However, there is problem that hard solid milk is slightly-soluble while solid milk with high solubility is fragile. Therefore, solid milk satisfying both of the hardness and the solubility could not be obtained. The present inventors made solid milk having a porosity of 30%-60% for the first time by controlling conditions such as the porosity, the fat content or water content within the basic ingredient, the compression force, the compression speed, the compression retention time (time to retain the maximum compression displacement), the amount of free fat, the humidifying condition, and the drying condition to make the solid milk. The solid milk thus made is provided with the hardness and the solubility. Namely, since the solid milk of the present invention has the porosity of 30%-60%, the required hardness in manufacturing and distribution and the required solubility at the point of use can be obtained.

[2] Another aspect of the solid milk of the present invention is the solid milk as described in [1] above, wherein fat content of the solid milk is equal to or more than 5% by weight. It is to be noted that "fat content" means percentage of the fat in the weight of the entire solid milk. As a more specific example of "equal to or more than 5% by weight" of the fat content, 5%-70% by weight can be mentioned as will be described later.

[3] Another aspect of the solid milk of the present invention is the solid milk as described in [1] above, wherein emulsified fat and free fat are included as fat, and free fat content is 0.5%-4% by weight. As will be described later, the solid milk of the present invention proactively includes the free fat which has been regarded preferable not to be generated, thereby obtaining solid milk having a predetermined interstice.

[4] Another aspect of the solid milk of the present invention is the solid milk as described in [1] above, wherein water content is 1%-4% by weight.

[5] Another aspect of the solid milk of the present invention is the solid milk as described in [1] above, wherein volume of the solid milk is 1 $cm^3$-50 $cm^3$. The solid milk of the present invention has larger volume compared to the conventional powdered milk since it is solid milk, so that adequate quantity can be easily measured and the transportation is convenient.

[6] Another aspect of the solid milk of the present invention is the solid milk as described in [1] above, wherein powdered milk is used as basic ingredient, and composition of the solid milk is homogeneous. Since predetermined powdered milk such as including free fat is used as the basic ingredient, solid milk composed of only the powdered milk can be made without forming a core or the like with sugar.

[7] Another aspect of the solid milk of the present invention is the solid milk as described in [1] above, wherein only powdered milk is used as basic ingredient. By using only the powdered milk as the basic ingredient, the compositionally-homogeneous solid milk can be easily obtained.

[8] Another aspect of the solid milk of the present invention is the solid milk as described in [1] above, wherein when a particle of the solid milk is put into 100 ml of water at 50° C., time required for the solid milk to completely dissolve is 5 sec-60 sec on vibrating condition of 1.5 laps/s and amplitude of 30 cm. Having a predetermined porosity, the solid milk of the present invention has fast solubility, thereby satisfying the requirements of the marketplace as commercial product.

[9] Another aspect of the solid milk of the present invention is the solid milk as described in [1] above, wherein the power at the time of breaking the sample by applying load in a direction which minimizes an area of a broken-out section is 20N-300N. The solid milk of the present invention has a certain degree of hardness so that a situation where the solid milk breaks during transportation can be prevented to some extent. It is to be noted that another aspect of the solid milk of the present invention is the solid milk having the porosity of 30%-60%, the fat content of 5%-70% by weight, the free fat content of 0.5%-4% by weight of the entire solid milk, the water content of 1%-4% by weight, the volume of 1 cm$^3$-50 cm$^3$, and only the powdered milk used as the basic ingredient. The solid milk adopting such composition has the fast solubility as indicated by [8] above and the above-mentioned degree of hardness.

[10] One aspect of a method for making solid milk of the present invention is a method of making solid milk including: a compression step for compressing powdered milk to obtain a solid form of a compressed powdered milk; a humidifying step for humidifying the compressed powdered milk obtained by the compression step; and a drying step for drying the compressed powdered milk humidified by the humidifying step; wherein a compression force in the compression step is 50 KPa-30 MPa.

[11] Another aspect of the method of making solid milk of the present invention is the method of making solid milk as described in [10] above, wherein substantially no additive is added in the compression step.

[12] Another aspect of the method of making solid milk of the present invention is the method of making solid milk as described in [10] above, wherein powdered milk whose fat content is equal to or more than 5% by weight is used in the compression step.

[13] Another aspect of the method of making solid milk of the present invention is the method of making solid milk as described in [10] above, wherein free fat content of the compressed powdered milk is 0.5%-4% by weight. In the method of making solid milk of the present invention, by proactively including the free fat which have been regarded preferable not to be generated, solid milk having a predetermined interstice is obtained.

[14] Another aspect of the method of making solid milk of the present invention is the method of making solid milk as described in [10], wherein the compression force in the compression step is controlled so that porosity of the compressed powdered milk assumes 30%-60%.

[15] Another aspect of the method of making solid milk of the present invention is the method of making solid milk as described in [10], wherein the compression step obtains the solid form of the compressed powdered milk by using a compression molding machine to compress the powdered milk and compression speed of the compression molding machine is 0.1 mm/s-100 mm/s. As will be verified in the embodiments described later, when the compression speed (mobile speed of pestle) is small, while it takes time to make the powdered milk solid, solid milk having high porosity, as well as high hardness and excellent solubility can be obtained. Therefore, in the above-mentioned range of compression speed, the desirable solid milk can be obtained. As will be shown by the embodiments described later, when the porosity is large (e.g. exceeding 50%), the solubility was improved while maintaining predetermined hardness by keeping the compression speed 0.1 mm/s-40 mm/s. On the other hand, when the porosity is small (e.g. 50% or less), predetermined solubility was achieved while maintaining predetermined hardness even if the compression speed is made approximately 100 mm/s.

[16] Another aspect of the method of making solid milk of the present invention is the method of making solid milk as described in [10], wherein compression retention time (time to retain the maximum compression displacement) in the compression step is 0.1 sec-1 min

[17] Another aspect of the method of making solid milk of the present invention is the method of making solid milk as described in [10], wherein amount of moisture added to the compressed powdered milk is 0.5%-3% by weight of the compressed powdered milk after the compression step.

[18] Another aspect of the method of making solid milk of the present invention is the method of making solid milk as described in [10], wherein humidifying time in the humidifying step is 5 sec-1 hour.

[19] Another aspect of the method of making solid milk of the present invention is the method of making solid milk as described in [10], wherein water content of the solid milk is controlled within 1% more or less than water content of the powdered milk used as the ingredient.

In this specification, "porosity" means a percentage of the volume of interstices accounting for the volume of powder mass (see e.g. "Iyakuhin no Kaihatu (Development of Medicine)" edited by Miyajima Kouichiro (Vol. 15), Hirokawa Shoten 1989, Page 240). More specifically, it is a value measured by "porosity measurement for solid milk" in a test example which will be described later.

In this specification, "powdered milk" means modified milk and the like which is dried and powdered mixture of fat-soluble component such as milk fat and resin and water-soluble component such as water, sugar, protein (including peptide and amino acid), and mineral. Examples of powdered milk include whole milk powder, modified milk powder, creamy powder, and the like.

In this specification, "solid milk" means a type of milk modified into solid state at normal temperature. The solid milk specifically means powdered milk molded into a predetermined size and size and weight, which renders, when dissolved in water, the same substance as that of the powdered milk dissolved in water.

In this specification, "compositionally-homogeneous" means to have substantially the same composition in all parts of the solid milk. It is to be noted that cases where components unintended for addition of solidness and solubility are added and mixed before compression molding are also "compositionally-homogeneous". However, the states in which the powdered milk having small grain diameter is attached to the sugar group having large grain diameter as core, for example as in the patent document 3 or the patent document 4 cannot be called "compositionally-homogeneous". Whereas in a case where coating layer is provided on the surface after making the solid milk, since the interior of the coating layer is the solid milk and the solid milk may be called "compositionally-homogeneous".

In this specification, "additive" means an agent or agents such as binder, disintegrant, lubricant, and leaven other than nutritional component In this specification, "substantially no additive is added" means to use basically only the powdered milk as the basic ingredient, where the additive is equal to or less that 0.5% by weight (preferably 0.1% by weight or less) that is the amount that the additive has no effect on the nutritional component. It is to be noted that in the present invention, it is preferable that only the powdered milk is used as the basic ingredient and that no additive other than the powdered milk is used.

Effect of the Invention

According to the present invention, porosity of solid milk is controlled, so that solid milk having preferred solubility and strength, and method of making the same can be provided.

According to the present invention, solid milk has a predetermined shape and size, so that solid milk that is easy to handle in transportation and easy to measure, and method of making the same can be provided.

According to the present invention, free fat that is deemed to be the cause of degradation of flavor resulting from oxidization degradation of fat while the powdered milk is preserved is intentionally generated within trouble-free range. Thus, by efficiently utilizing the free fat as lubricant or the like, solid milk having little degradation of flavor and the time degradation caused by free fat, and method of making the same can be provided without adding an additive.

According to the present invention, the powdered milk can be made into solid milk as is, so that solid milk whose component composition is controllable with only nutritional component by controlling the composition of the powdered milk itself, and method of making the same can be obtained.

According to the present invention, a situation where the powdered milk is attached to a pestle and a mortar of a compression molding machine can be avoided by controlling rate of free fat in the powdered milk, porosity and amount of water (especially the free fat) within suitable range, thereby providing highly productive method of making solid milk.

According to the present invention, the free fat can be utilized effectively as substitute for an additive as described above, so that method of making solid milk from powdered milk as is without adding additives such as lubricant to the powdered milk can be provided.

According to the present invention, method of making powdered milk and solid milk which can manufacture not only the powdered milk but also the solid milk based on the powdered milk after manufacturing the powdered milk can be provided.

BRIEF DESCRIPTION OF THE DRAWINGS

FIG. 5A is a graph showing relationship between compression speed and hardness of the obtained solid milk. FIG. 5B is a graph showing relationship between compression speed and free fat. FIG. 5C is a graph showing relationship between hardness and free fat of solid milk; FIG. 6A is a graph showing relationship between compression speed and hardness of the obtained solid milk. FIG. 6B is a graph showing relationship between compression speed and free fat.

DETAILED DESCRIPTION OF THE PREFERRED EMBODIMENTS

1. Solid Milk

Figure 1:
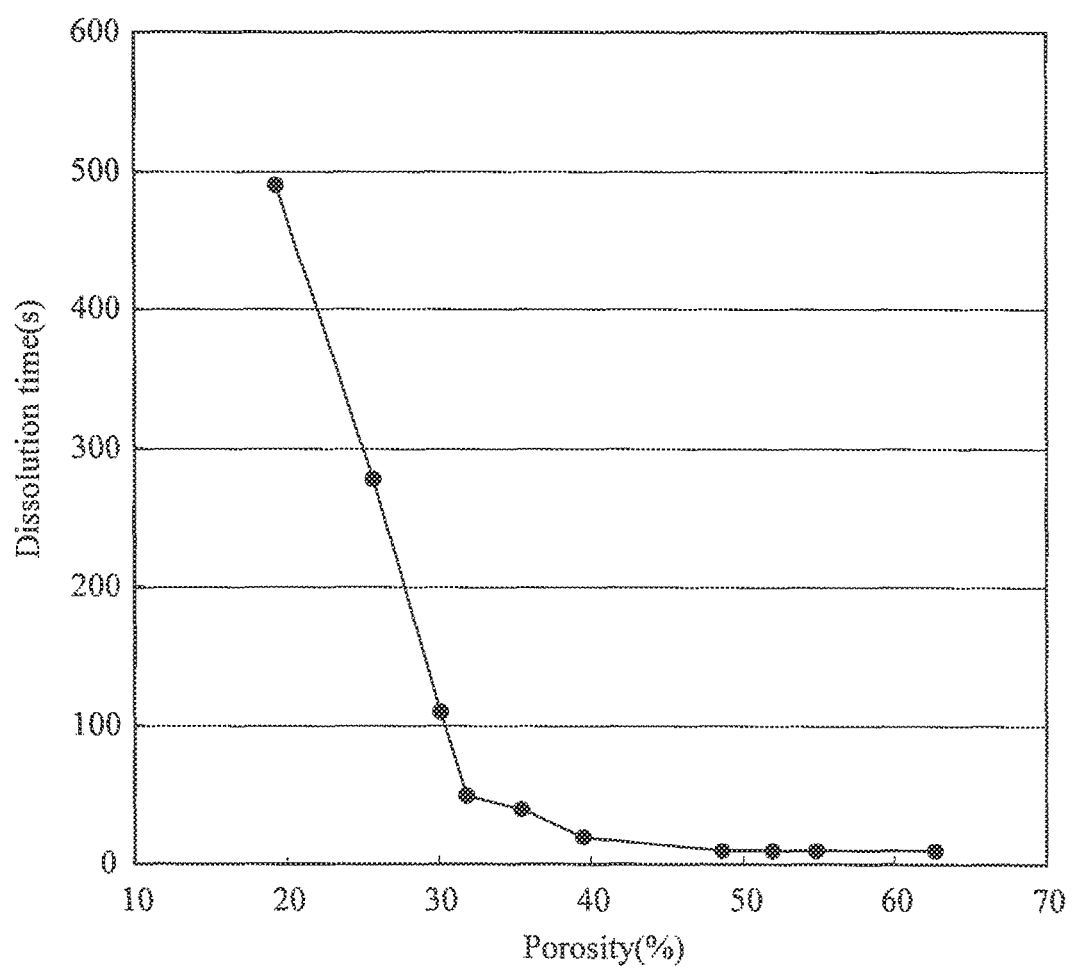
FIG. 1 is a graph showing relationship between porosity and dissolution time in embodiment 1.

The solid milk of the present invention has porosity of 30%-60% (between 30% and 60% inclusive). As the porosity increases the solubility increases but the strength decreases. Also, when the porosity is small, the solubility is low. The porosity is mainly controlled by the compression force in the compression process. It is to be noted that in the present invention, while the porosity may be 35%-50%, the porosity may be adjusted to 30%-35%, 30%-45%, 40%45%, or 40%-50%, according to its intended purpose. Also, as proven by embodiments which will be described later, even if the solid milk has high porosity, one with excellent solubility and hardness can be obtained by appropriately adjusting the porosity, the fat content or water content within the basic ingredient, the compression force, the compression speed, the compression retention time (time to retain the maximum compression displacement), the amount of free fat, the humidifying condition, and the drying condition. Therefore, as preferable porosity of the solid milk in the present invention, more than 50% and equal to or less than 65% can be mentioned while more than 50% and equal to or less than 60%, more than 50% and equal to or less than 58%, more than 50% and equal to or less than 55% are also applicable. Also, the porosity may be 55%-65%, 55%-60%, or 55%-58%. By adjusting the porosity to be within these ranges, it is made possible to obtain favorable solid milk having resolved the problems of an oil off and the like as will be described later.

It is preferable that plurality of interstices exist in solid milk. The interstices (hollows) are preferably distributed evenly. Since the interstices are distributed almost evenly in the solid milk, higher solubility can be obtained. The larger the interstice, the easier the water can penetrate, so that fast solubility can be obtained. On the other hand, when the size of the interstice is too big, the strength is decreased or the surface of the solid milk becomes rough. Therefore, as the size of the interstice, 10 μm-500 μm can be mentioned while 50 μm-300 μm is preferable. This size of the interstice can be measured with known means, such as an examination of the surface and the cross-section plane of the solid milk by using a scanning electron microscope.

The components of the solid milk is basically the same as those of the powdered milk which is the basic ingredient excluding the amount of water. Sugar, protein, mineral, and water can be mentioned as the components of the solid milk.

As the fat content in the solid milk, 5%-70% by weight can be mentioned as an example, while 5%-50% by weight is preferable, and 10%-45% by weight is more preferable.

The solid milk of the present inventions may include the emulsified fat and the free fat as the fat. Namely, in the conventional powdered milk and the solid milk, the free fat has been proactively excluded due to the problems of degrading flavor and floating on water (oil off) when dissolved in heated water. Preferably, the solid milk of the present invention proactively includes this free fat for an effective use as substitute for the lubricant and the like. Thus, the present invention can produce good solid milk without using additives. However, too much free fat may result in problem of the oil off. Therefore, as the free fat content in the solid milk of the present invention, 0.5%-4% by weight can be mentioned, while 0.7%-3% by weight is preferable, and 1%-2.5% by weight is more preferable. This is because a preferable hardness, solubility, and excessive oil off can be controlled as shown in the embodiments which will be described later. It is to be noted that the amount of free fat where the oil off will become problematic depends on the physicality such as the fat composition and the spherical form of fat within the powdered milk used as the basic ingredient, so that the amount of the free fat included in the solid milk may be appropriately adjusted within the above-mentioned ranges. It is to be noted that when making the solid milk, even if the same basic ingredient is used, by reducing the compression speed (mobile speed of pestle of the compression molding machine which is obtained by dividing compression displacement by compression time) in the compression process, for example, solid milk having a certain degree of hardness while having a high porosity can be obtained. When the solid milk is thus made, the free fat tends to increase. Therefore, in the present invention, the solid milk may contain more free fat than ordinary solid milk.

When there is much water contained in the solid milk, the storage stability degrades while scarce water makes the solid milk fragile. Therefore, as the water content in the solid milk of the present invention, 1%-4% by weight can be mentioned, while 2%-3.5% by weight is preferable.

The shape of the solid milk of the present invention is not specifically limited as long as the solid milk has a certain size. As the shape of the solid milk, column-shaped, elliptical column-shaped, cubic-shaped, rectangular parallelepiped-shaped, plate-shaped, sphere-shaped, polygonal column-shaped, polygonal pyramid-shaped, frustum of pyramid-shaped, and polyhedron can be mentioned, while column-shaped or quadrangular prism-shaped is preferable from the viewpoint of portability convenience, it is to be noted that in order to avoid situation that the solid milk breaks, the corners are preferably chamfered.

The solid milk of the present invention preferably makes a quantity of milk to be drank at one time when one to several particles of solid milk (preferably one particle of solid milk) are dissolved in heated water. Therefore, as the volume of the solid milk, 1 cm$^3$-50 cm$^3$ can be mentioned, while 2 cm$^3$-30 cm$^3$ is preferable, and 4 cm$^3$-20 cm$^3$ is more preferable.

The solid milk of the present invention needs to have a certain level of solubility. For the solid milk of the present invention under the measurement condition of solubility which will be described later, one having solubility of 60 sec or less can be mentioned, while 45 sec or less is preferable, and 30 sec or less is more preferable. However, even liquid cannot be obtained if the time is too short, so that the solubility of 5 sec or more is preferable.

The solid milk of the present invention needs to have a certain level of strength in order to avoid as much as possible situation where the solid milk breaks while being transported. For the solid milk of the present invention under the measurement condition of hardness which will be described later, one having hardness of 20 N or more is preferable. On the other hand, from the perspective of solubility, hardness of 300 N or less is preferable. The hardness of the solid milk may be between 30 N and 200 N inclusive or between 50 N and 100 N inclusive. In this specification, the hardness means the hardness under the measurement condition of the hardness of tablet as will be described later.

2. Manufacturing Process

The method for making the solid milk of the present invention includes a compression step for compressing powdered milk to obtain a solid form of compressed powdered milk, a humidifying step for humidifying the compressed powdered milk obtained by the compression step, and a drying step for drying the compressed powdered milk humidified by the humidifying step.

2.1 Compression Step

The compression step is for compressing a powdered milk to obtain solid form of compressed powdered milk. In the compression step, the powdered milk is compressed with relatively low pressure to the extent that the powdered milk can be moved over to a following step, thereby obtaining compressed powdered milk that secures interstice for the water to infiltrate. In the compression step, the powdered milk is compressed in order to fulfill the requirements that compressed powdered milk having appropriate interstices and having shape retaining attribute. Namely, the porosity in this compression step is closely related to the porosity of the solid milk. Also, if the lubrication of the compressed powdered milk is scarce, problem of failure in making a tablet that is a part of the compressed powdered milk attaches to apparatus such as a tabletting machine. Moreover, if the shape retaining attribute of the compressed powdered milk is bad, problem arises in the procedure of making solid milk that some of the product cannot maintain the shape.

For the basic ingredient of the compression process, preferably only powdered milk is used and no additive is substantially added. The powdered milk may be purchased commercially or those produced by the known producing method (such as the producing method as disclosed in Japanese Patent Application Laid-Open Publication Nos. HEI10-262553, HEI11-178506, 2000-41576, 2001-128615, 2003-180244, 2003-245039, and the like). As the composition of the powdered milk, one similar to that of the above-mentioned solid milk can be mentioned. It is to be noted that as the basic ingredient in the compression process, fat may be added. However, if the fat is added, the fat may cause the oil off. And the added fat sticks to the surface of the powdered milk, so that the precision of filling to the mortar is decreased. Therefore, in the compression stage, the powdered milk which is made to include a target free fat content is preferably used.

When the fat content in the powdered milk is large, the compression force may be small. On the other hand, when the fat content in the powdered milk is small, the compression force must be large. Therefore, the use of powdered milk with more fat content satisfies the requirement for providing appropriate interstices and producing compressed powdered milk with shape retaining attribute. From such viewpoints, for the fat content in the powdered milk, 5%-70% by weight can be mentioned, while 5%-50% by weight is preferable, and 10%-45% by weight is more preferable.

As described above, the powdered milk including the free fat is preferable. In the present invention, this free fat is effectively used instead of lubricant or the like. Accordingly, the present invention enables production of good solid milk without adding additives. For the free fat content in the solid milk of the present invention, 0.5%-3% by weight can be mentioned, while 0.7%-2.4% by weight is preferable, and 1%-2% by weight is more preferable.

When much water is included in the powdered milk, the shelf life degrades, while when the water is less, it becomes fragile (the shape retention attribute worsens). Therefore, for the content of water in the solid milk, 1%-4% by weight can be mentioned, while 2%-3.5% by weight is preferable.

In the compression process, the compressed powdered milk is produced by compression means for compressing the powdered milk to obtain compressed powdered milk of the solid state. The compression means is not specifically limited as long as being capable of compressing the powdered milk to obtain the compressed powdered milk of the solid state. As the compression means, a compression molding machine such as a known tabletting machine and a compression test apparatus can be mentioned, while the tabletting machine is preferable. It is to be noted that for a tabletting machine, those described in Japanese Examined Patent Application Publication No. SHO33-9237, Japanese Patent Application Laid-Open Publication No. SHO53-59066, Japanese Patent Application Laid-Open Publication Nos. HEI6-218028, 2000-95674, and Japanese Patent No. 2650493 can be mentioned.

It is to be noted that when using the compression molding machine to compress powdered object, for example, the powdered object is put in a mortar, pound with a pestle to add compression force to the powdered object, and made into solid state. If the powdered object has scarce lubricity, the situation may occur where the powdered object sticks to the surface of the pestle. This will not only degrade the quality of the product but will require cleaning of the surface of the pestle, resulting in the decrease of the process yield. Therefore, addition of lubricant is performed especially in manufacturing medicine. However, the lubricant is wax that is not very soluble in water. Therefore, it is undesirable to add lubricant to such thing as the solid milk that is for drinking in a state dissolved in heated water. This is one of the reasons why the manufacturing of the solid milk has been difficult. The present invention, as described above, uses as the lubricant an adequate amount of the free fat that has been regarded as desirable not to be generated, thereby preventing the situation where the powdered milk sticks to the pestle. Moreover, as described above, by obtaining the powdered milk compressed having an appropriate porosity, it is made possible to obtain solid milk with an excellent shape retaining attribute. Also, while the addition of disintegrant may cause a situation where sediment is generated, with the method for making the solid milk of the present invention, the disintegrant is unnecessary, so that such situation can be effectively avoided.

The environmental temperature in the compression process is not specifically limited, so that the compression process can be performed in the room temperature. More specifically, for the environmental temperature in the compression process, 10° C.-30° C. can be mentioned. For the humidity in the compression process, e.g. 30% RH-50% RH can be mentioned. It is preferable in the compression process that the compression of the powdered milk is performed continuously.

As confirmed by the embodiments that will be described later, while slowing down the compression speed (movement speed of the pestle in the compression molding machine) results in longer time for making the powdered milk solid, solid milk having high porosity as well as a certain degree of hardness can be obtained. On the other hand, while speeding up the compression speed enhances the manufacturing ability for making the powdered milk solid, it is made difficult to obtain the powdered milk that maintains the hardness. From these viewpoints, for the compression speed of the tabletting machine, 0.1 mm/s-100 mm/s can be mentioned, while 0.5 mm/s-40 mm/s is preferable, 2 mm/s-20 mm/s is more preferable, and 3 mm/s-10 mm/s is further more preferable. In case the porosity is large (e.g. porosity exceeds 50%), by setting the compression speed to 0.1 mm/s-40 mm/s a predetermined degree of hardness can be maintained while improving the solubility. On the other hand, in case the porosity is small (e.g. porosity is 50% or less), even when the compression speed is made about 100 mm/s, the predetermined solubility can be obtained while maintaining the predetermined degree of hardness. When the compression speed is slow, although a lot of time is required for making the solid milk, it is preferable, as described above, since the predetermined solubility can be obtained while maintaining the predetermined degree of hardness. For the compression force of the compression molding machine, 50 KPa-30 KPa can be mentioned, while 0.1 MPa-10 MPa is preferable, 0.1 Mpa-8 MPa is more preferable, 0.1 MPa-5 MPa is further preferable, 0.1 MPa-3 MPa is further preferable, and 0.1 MPa-1 MPa is especially preferable. It is to be noted that from the viewpoint of shortening the manufacturing time, the compression force may be made to more than 1 MPa or 2 Mpa. It is to be noted that the compression force means the pressure per unit area applied to the powdered object layer in the maximum compression displacement, which can be measured by the commercially available load cell and the like. While not specifically limited, 2 mm-4 mm can be mentioned for the compression displacement, and 0.3 s-1 s can be mentioned for the compression time.

When a tabletting machine of single core reciprocating system such as a single punch tabletting machine is used as the compression molding machine, the movement speed of the pestle reciprocating may be adjusted. Also, when a rotary tabletting machine is used as the compression moldering machine, the movement speed of the pestle can be adjusted by controlling the rotation frequency.

The compression process provided with compression retention time (time to maintain the maximum compression displacement), is a preferable embodiment of the present invention. As verified by the embodiments that will be described later, it is found that compared to one without this compression retention time, by providing a predetermined compression retention time voluntarily even if very small, the porosity of the obtained solid milk decreases and the hardness is increased. Therefore, in order to obtain solid milk having a higher hardness, setting a compression retention time of e.g. 0.1 sec-1 min can be mentioned, while 0.1 sec-30 sec is more preferable, 0.1 sec-5 sec is more preferable, and 0.1 sec-2 sec is further preferable. When the compression retention time is long, it requires a lot of time when making solid milk. However, as described above it is made possible to obtain solid milk having appropriate porosity while maintaining hardness.

2.2 Humidifying Process

The humidifying process is for humidifying the compressed powdered milk obtained by the compression process. By humidifying the compressed powdered milk, a part of the particle in the vicinity of the surface of the compressed powdered milk melts to be bridged. Thus the strength in the vicinity of the surface of the compressed powdered milk is increased.

In the humidifying process, the compressed powdered milk can be humidified by the humidifying means for humidifying the compressed powdered milk. As humidifying means, known humidifying means such as high humidity chamber, spray, or steam can be mentioned. Also, as humidifying method, known humidifying method such as placing the object under high humidity condition, misting the object with water by a spray, or spraying steam on the object can be adopted. For humidity in the high humidity environment, e.g. 60% RH-100% RH can be mentioned, while 80% RH-100% RH is preferable, and 90% RH-100% RH is more preferable. Also, for the time to place the object under the high humidity environment, e.g. 5 sec-1 hr can be mentioned, while 10 sec-20 min is preferable, and 15 sec-15 min is more preferable. However, the humidifying time may be appropriately adjusted according to the humidity, temperature, the required physicality of the solid milk, and the like. The humidifying time may be e.g. 1 min-15 min, 1 min-5 min, 5 min-15 min, or 5 min-10 min. For the temperature in the method of placing the object under high humidity environment, e.g. 30° C.-100° C. can be mentioned, while 40° C.-80° C. is preferable. In the humidifying process, under the condition of higher temperature and higher humidity, the process requires shorter time. As verified by the embodiments that will be described later, by keeping the humidifying time within certain range, the hardness of the obtained solid milk can be improved.

The amount of water added (hereinafter, also referred to as "humidifying amount") to the compressed powdered milk in the humidifying process may be appropriately adjusted. However, in the present invention, since only the powdered milk is basically used as the basic ingredient, as indicated by the embodiment (embodiment 5) and FIG. 3 that will be described later, the following range is preferable as the humidifying amount. Namely, while the humidifying amount of 0.5% increases the hardness, the humidifying amount of 1% almost doubles the hardness. Thus, the hardness tends to increase as the humidifying amount increases. On the other hand, the increase of the hardness stops with the humidifying amount of 2.5% or more. Also, when the humidifying amount exceeds 3%, the compressed powdered milk dissolves, becomes deformed, or sticks to the apparatus during transfer. Accordingly, for the amount of water added to the compressed powdered milk, 0.5%-3% of the mass of the compressed powdered milk is preferable, while 1%-2.5% is more preferable.

2.3 Drying Process

The drying process is for drying the compressed powdered milk that has been humidified by the humidifying step. By the drying step the compressed powdered milk that has been humidified by the humidifying step is dried, so that the surface tackiness is removed, thereby allowing the solid milk to be handled as a manufactured article. As the drying method in the drying process, known method that can dry the compressed powdered milk that has been humidified by the humidifying step can be adopted. For example, method for placing the object under an environment of low humidity and high temperature, or bringing the object into contact with drying air and high temperature drying air can be mentioned.

For the "humidity" in the method for placing the object under environment of low humidity and high temperature, 0% RH-30% RH can be mentioned, while 0% RH-25% RH is preferable, and 0% RH-20% RH is more preferable. Thus, it is preferable to set the humidity as low as possible. For the "temperature" in the method for placing the object under an environment of low humidity and high temperature, 20° C.-150° C. can be mentioned, while 30° C.-100° C. is preferable, and 40° C.-80° C. is more preferable. For the "drying time" in the method for placing the object under environment of low humidity and high temperature, 0.2 min-2 hr can be mentioned, while 0.5 min-1 hr is preferable, and 1 min-30 min is more preferable.

As described above, if much water is included in the solid milk, the shelf life is degraded, while if the water is less it becomes fragile. Therefore, in the drying process, it is preferable to control the water content in the solid milk to be within 1% below and above (preferably within 0.5% below and above) the water content in the powdered milk used as the basic ingredient by controlling the conditions such as drying temperature and drying time.

3. Method of Making Powdered Milk and Solid Milk

The method of making the powdered milk and the solid milk of the present invention includes a process of making powdered milk, and a process of making solid milk by using the powdered milk as the basic ingredient. It is to be noted that a part of the powdered milk made in the process of making powdered milk may be used as powdered milk to be filled directly in a container. Thus, the powdered milk and the solid milk can be obtained.

3.1 Method of Making Powdered Milk

Details of the manufacturing process of the powdered milk differ depending on the types of the manufactured articles such as powdered skimmed milk, modified milk represented by powdered milk for infants. Basically however, the powdered milk can be made by the process of "basic ingredient (adjustment)→clarification→sterilization→concentration→homogenization)→spray drying→sieving→filling". It is to be noted that the size of the powdered milk after spray drying assumes about 5 μm-150 μm, and the size of the granulated substance of the powdered milk assumes about 100 μm-500 μm. Also, in the state where the powdered milk and its granulated substance are mixed, the interstice assumes about 5 μm-150 μm.

Milk can be mentioned as the basic ingredient of the powdered milk. For the milk, bovine milk can be mentioned, and more specifically, milk of a cow (Holstein, Jersey, etc.), a goat, a ewe, a buffalo, or the like can be mentioned. The fat content can be adjusted by removing a part of fat from the milk by the method of centrifugal separation or the like. Also, the following nutritional components can be added. On the other hand, when making modified powdered milk, the following nutritional components are added to the water and mixed to be used.

The powdered milk can be made by the processing the above-mentioned liquid as the ingredient by the known manufacturing method including processes of "clarification", "sterilization", "concentration", "spray drying", "sieving", and "filling".

For the protein as the basic ingredient of the powdered milk, milk protein and milk protein fraction such as casein, milk serum protein (α-lactalbumin, β-lactoglobulin, and the like), milk serum protein concentrate (WPC), milk serum protein isolate (WPI); animal protein such as egg protein; plant protein such as soy protein and wheat protein; peptide having the foregoing protein decomposed into variety of chain lengths by enzyme or the like; amino acid such as taurine, cystine, cysteine, arginine, and glutamine may be used alone or by mixture.

For the fat as the basic ingredient of the powdered milk, animal oil and fat such as milk fat, lard, beef fat, fish vegetable oil such as soy oil, canola oil, corn oil, coconut oil, palm oil, palm kernel oil, safflower oil, cottonseed oil, linseed oil, and MCT; or fractional oil, hydrogenated oil, or ester exchanged oil of the foregoing oil may be used alone or by mixture.

For the carbohydrate as the basic ingredient of the powdered milk, lactin, simple sugar, glucose, malt sugar, oligosaccharide such as galacto-oligosaccharide, fructo-oligosaccharide, lactulose, polysaccharide such as farina, soluble polysaccharide, and dextrin, or artificial sweetener may be used alone or by mixture.

In addition, vitamin group, mineral group, aroma chemical, flavoring substance, or the like may be added as the basic ingredient of the powdered milk.

3.1.1. Clarification Process

The clarification step is for removing microscopic foreign substance included in cow milk or the like by known means such as centrifugal separator, filter, or the like.

3.1.2. Sterilization Process

The sterilization process is for deadening microbe such as bacteria included in cow milk or the like. The deadening temperature and holding time in the sterilization process vary depending on the types of the powdered milk, and conditions related to the known sterilization can be adopted.

3.1.3. Concentration Process

The concentration process is an arbitrary process for preparatorily concentrating milk or the like before the spray drying process which will be described later, and known means such as vacuum evaporative can and conditions can be adopted.

3.1.4. Homogenization Process

The homogenization process is an arbitrary process for homogenizing the size of solid component such as fat globule distributed within cow milk or the like to fixed size, and known means and conditions for applying high pressure to the processed liquid so as to pass the processed liquid through a narrow gap.

3.1.5. Spray Drying Process

The spray drying process is for obtaining fine particles by evaporating the water within the concentrated milk. A known means such as spray dryer and known condition can be adopted.

3.1.6. Sieving Process

The sieving process is for removing particles whose diameter is large such as hard-packed powder by passing the fine particles obtained by the spray drying process through sieves for particle size regulation.

3.1.7. Filling Process

The filling process is for filling the powdered milk in bags, cans, and the like.

For the method of making the powdered milk and the solid milk of the present invention, the above-mentioned method of making solid milk may be adopted after making the powdered milk as mentioned above. Namely, the above-mentioned compression process may be performed using the powdered milk having passed through the above-mentioned sieving process as the basic ingredient.

4. Usage of Solid Milk

The solid milk of the present invention is generally dissolved in heated water for drinking. More specifically, after pouring heated water in a covered container, particles of the solid milk of the present invention as required are put in. Then, preferably the container is lightly shaken in order to quickly dissolve the solid milk for drinking in the state of appropriate temperature.

While embodiments are shown hereinafter and the feature of the present invention will be described, the present invention is not limited to these embodiments. In the following description, methods for evaluating items to be evaluated in the embodiments will be described before describing reference examples and embodiments.

Test Example 1 (Porosity Measurement for Solid Milk)

The porosity of the solid milk is obtained by the following equation:

$$\text{Porosity (\%)} = (1 - W/PV) \times 100$$

W: weight of solid substance (g)
P: density of solid substance measured using Beckmann pneumatic densimeter (g/cm$^3$)
V: cubic measure obtained by measuring diameter and thickness of the solid substance with a micrometer to be calculated (cm$^3$)

Test Example 2 (Measurement of Free Fat Content)

The free fat content is measured as follows: Firstly, while taking care not to mash the solid milk, the solid milk was finely cut into pieces with cutter and smashed up (smash up process). Thereafter, the smashed up solid milk was passed though 32 mesh sieve (sieving process). Taking the sample after having passed through the sieving process, the free fat content was measured according to the method described in 'Determination of Free Fat on the Surface of Milk Powder Particles', Analytical Method for Dry Milk Products, A/S NIRO ATOMIZER (1978). It is to be noted that with this method, the free fat content is indicated by % by weight of the fat extracted with an organic solvent (e.g. n-hexane or carbon tetrachloride) by shaking at fixed speed for fixed time.

Test Example 3 (Hardness Measurement)

The hardness of the solid milk (tablet hardness) was measured using a hardness tester manufactured by Okada Seiko Co., Ltd. Namely, load was applied in the direction where the area of the broken-out section of the sample is minimized to measure the load upon breaking.

Test Example 4 (Solubility Measurement)

The solubility of the solid milk was measured as follows: Firstly, 100 ml of water was poured into a capped glass pot of 200 ml and heated to 50° C. A particle of solid milk was put into this water, immediately shaken, and the time until the solid milk completely disappears was measured. The shaking condition was 1.5 laps/s and amplitude of 30 cm.

Test Example 5 (Floating Oil Measurement)

The floating oil (oil off) was measured as follows: Firstly, 50 ml of water at 50° C. in 100 ml beaker was prepared. A particle of solid milk was put into the water, and completely dissolved. After leaving at rest for 2 hours, presence of oil droplets was determined by visual observation.

Test Example 6 (Peroxide Value Measurement)

The peroxide value is measured as follows: Hot water of 60° C.-70° C. was added to the sample, mixed well until dissolved to obtain emulsified liquid. Nonionic surface-active agent (polyoxy octyl phenol ether) and sodium tripolyphosphate were added thereto and after being demulsified, centrifugalized into oil layer and water layer. The oil layer was taken out and measured using an iodine titration technique (Japan Oil Chemises Society, Kijyun Yushi Bunnseki Shiken-hou (Reference oil analysis and test technique, peroxide value (chloroform method)). The measured value according to this technique was indicated by mile equivalent amount of iodine for the sample of 1 kg when iodide of potash is added to the sample. This may be used as indication of oxidation degradation.

Test Example 7 (Flavor Test)

For the flavor test, the sample was dissolved in water of 50° C. so that the sample assumes 14% by weight of density and then drunk by ten panelist who rate from the palatability viewpoint ranging between seven degrees from 1 to 7 (4 is the mid-value indicating average palatability), and the average thereof was used for the evaluation.

Reference Example 1 (Making Powdered Milk)

The powdered milk including various components was made from liquid which was mixture of fat, sugar, protein, milk, and mineral group added to water and processed in the process order of homogenization, concentration (evaporation), and spray drying.

Embodiment 1

(Relationship Between Porosity, Solubility, and Strength)

Figure 2:
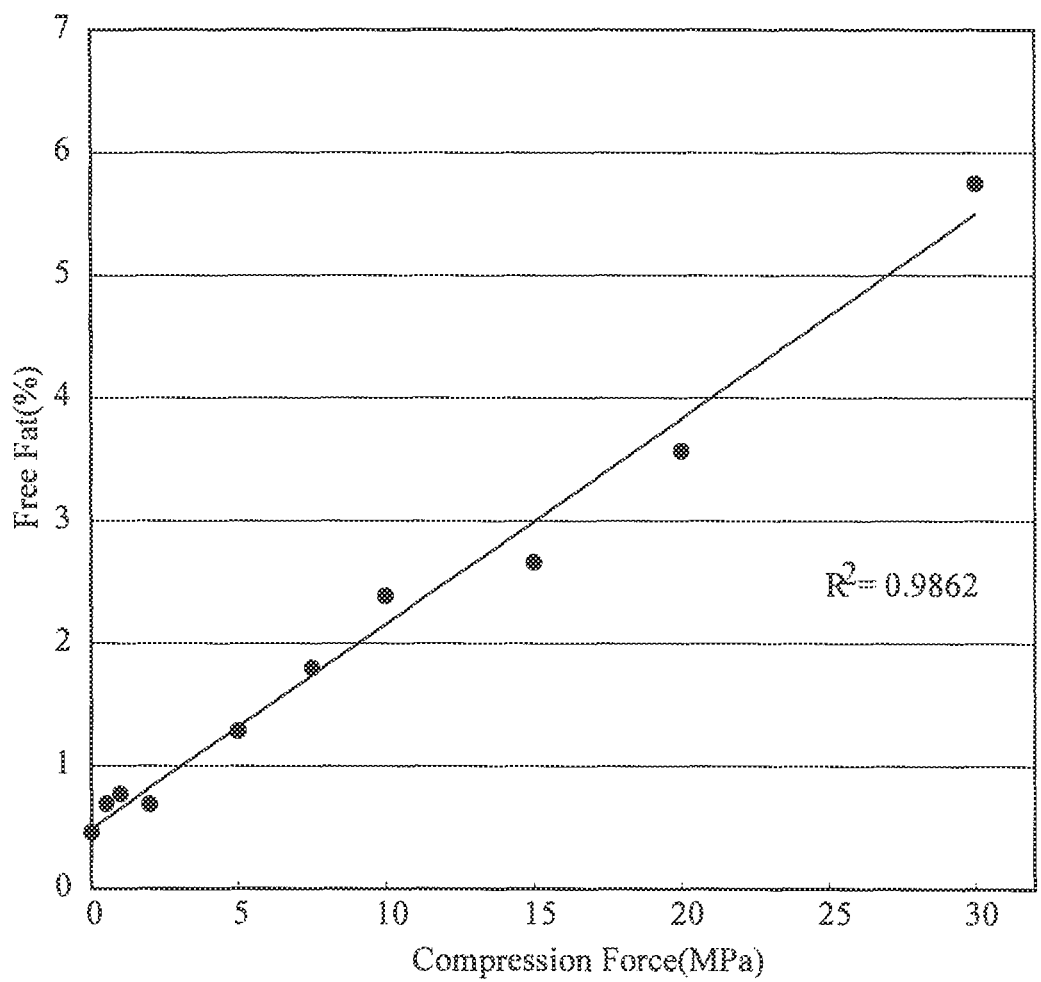
FIG. 2 is a graph showing relationship between compression force and free fat in embodiment 1.

The powdered milk obtained by the manufacturing method of the reference example (including 25% by weight of fat, 58.3% by weight of sugar, 11.7% by weight of protein, mineral, water, etc.) was compressed and molded by a universal tester Autograph (manufactured by Shimadzu Corporation) under conditions of compression force of 0.5 MPa-30 MPa and pestle descending speed of 10 mm/min. Thereafter, left in a temperature and humidity chamber (manufactured by TABAI ESPEC) under conditions of 40° C. and 95% RH for 5 minutes. Then dried with air oven (manufactured by Yamato Scientific Co., Ltd) at 40° C. for 30 minutes. Thus, solid milk with diameter of 25 mm and weight of approximately 5 g was obtained. The powdered milk used as the basic ingredient and the solid milk obtained therefrom was evaluated by test examples 1-5. The result thereof is shown in Table 1. Also, the relationship between the porosity and the dissolution time in the Table 1 is shown in FIG. 1. The relationship between the compression force and the free fat in the Table 1 is shown in FIG. 2.

of 31.8% (compression force of 10 MPa) dissolved in 50 sec. Therefore, it is found that from the solubility point of view, the porosity of 30% or more and the compression force of 15 MPa or less are preferable.

Also, it is seen from Table 1 that when the compression force exceeds 20 MPa, oil droplets are observed on the surface of water, so that there is problem of oil off. When the compression force is 15 MPa or less, the oil off is not so much as causing practical trouble. Namely, from the oil off point of view, it is seen that the porosity of 30% or more and the compression force of 15 MPa or less are preferable. Meanwhile, it is seen from FIG. 2 that the compression force and the generated amount of free fat are correlated, so that the amount of free fat can be controlled by controlling the compression force.

The compression molded substance also increased the hardness by humidifying and drying process. The hardness required for transportation and handling by the user is about 20 N, which was achieved by molding with compression force of 1 MPa, and performing humidification and drying process.

It is seen that for the evaluation items including the solubility, the hardness before and after the humidification and drying, and the oil off, the compression condition with the porosity of about 30%-55% and the compression force of about 0.5 MPa-15 MPa is appropriate.

TABLE 1

Compression force and properties of solid milk

| | Compression force (MPa) | | | | | | | | | |
|---|---|---|---|---|---|---|---|---|---|---|
| | 0 | 0.5 | 1 | 2 | 5 | 7.5 | 10 | 15 | 20 | 30 |
| Porosity (%) | 62.7 | 54.8 | 51.9 | 48.6 | 39.5 | 35.4 | 31.8 | 30.1 | 25.7 | 19.3 |
| Free fat (%) | 0.46 | 0.69 | 0.77 | 0.69 | 1.29 | 1.80 | 2.39 | 2.66 | 3.57 | 5.75 |
| Hardness before humidification (N) | 0 | 1.5 | 5.1 | 8.2 | 32.9 | 53.3 | 68.6 | 83.8 | 116.5 | 181.7 |
| Hardness (N) | ▫ | 18.3 | 30.2 | 40.3 | 81.8 | 106.0 | 140.3 | 154.4 | 185.3 | 291.0 |
| Solubility (s) | 10 | 10 | 10 | 10 | 20 | 40 | 50 | 110 | 278 | 490 |
| Oil off (—) | ▫ | ▫ | ± | ± | ± | ± | ± | ▫ | ▫ | ▫ |

Oil off evaluation

▫ No floatage

± Microscopic floatage (smaller than 0.5 mm) not so much as causing practical trouble is observed ▫ Floatage (larger than 0.5 mm) in the form of oil droplets is observed It is seen from FIG. 1 that the porosity and the dissolution time are correlated. Also, it is seen from FIG. 1 that the dissolution time changes rapidly in the vicinity of 30% porosity. The practical dissolution time for the solid milk to be dissolved for drinking is preferably within 120 sec and more preferably within 60 sec. As shown in Table 1, the solid milk with the porosity of 25.5% (compression force of 20 MPa) required 278 sec (approximately 4.6 min) to dissolve. Therefore, this solid milk is not practical. The solid milk with the porosity of 30.1% (compression force of 15 MPa) dissolved in 110 sec. Also, the solid milk with the porosity Embodiment 2

(Using Powdered Milk of Powder or Granulated Powder with Different Fat Content)

In this embodiment, except that the powdered milk with the fat content of 5%-40% by weight is molded with the compression force of 5 MPa, solid milk with diameter of 25 mm and weight of approximately 5 g was obtained by the same process and condition with those of the embodiment 1. These were evaluated by the test examples 1-5. The result thereof is shown in Table 2. It is to be noted that the evaluation items of the oil off is the same as those of the embodiment 1.

TABLE 2

Fat content and properties of solid milk

| | | Fat content (%) | | | | | |
|---|---|---|---|---|---|---|---|
| | | 5 | 10 | 18 | 25 | 30 | 40 |
| Powdered milk as ingredient | Shape | granule | granule | granule | granule | powder | powder |
| | Free fat (%) | 0.03 | 0.28 | 0.46 | 0.46 | 1.33 | 1.48 |
| Molded substance | Porosity (%) | 45.0 | 42.2 | 41.5 | 39.5 | 36.3 | 31.0 |
| | Free fat (%) | 0.11 | 0.51 | 0.84 | 1.29 | 3.02 | 3.93 |
| | Hardness before humidification (N) | 0 | 4.2 | 12.5 | 32.9 | 17.4 | 30.0 |
| | Hardness (N) | 18.1 | 17.6 | 46.0 | 81.8 | 25.9 | 83.0 |
| | Solubility (s) | 30 | 20 | 30 | 20 | 40 | 50 |
| | Oil off (—) | ○ | ○ | ± | ± | ○ | ± |

One that used the powdered milk with the fat content of 5% by weight included some of the compressed and molded substance before humidification and drying process (free fat of 0.11%) whose hardness is low, so that transition to the next process has been a little difficult. One that used the powdered milk with the fat content of 10% by weight or more yielded the compressed and molded substance of favorable performance regardless of the presence of granulation.

Thus, with the powdered milk including the fat to some extent, the compressed and molded substance provided with the conflicting, elements of hardness and fast solubility can be obtained without adding specific additive by adjusting the compression force, the porosity, and the amount of free fat to the limitation of the present invention.

Embodiment 3

(Effect of Free Fat)

In the embodiment 2, when the powdered milk with the fat content of 5% by weight was used, some of the compressed and molded substance before humidification and drying process had low hardness. Butter oil (manufactured by Corman) of (i) 0.5% by weight, (ii) 1.0% by weight, and (iii) 2.0% by weight were added to the powdered milk with the fat content of 5% by weight, mixed well, and then compressed and molded under the conditions shown in the embodiment 2 to examine the hardness increasing effect of the free fat. The result thereof is shown in Table 3.

TABLE 3

Amount of additional fat and properties of solid milk

| | Amount of butter oil added (%) | | | |
|---|---|---|---|---|
| | 0 | 0.5 | 1 | 2 |
| Porosity (%) | 45.9 | 45.6 | 45.6 | 44.7 |
| Hardness before humidification (i) (N) | 0 | 0 | 0 | 0 |
| Hardness before humidification (ii) (N) | 0 | 7.2 | 7.3 | 7.3 |

(i) Compression molded immediately after adding butter oil
(ii) Compression molded after adding butter oil and preserved in hermetic container for 2 days While all of those that were compressed and molded immediately after adding the butter oil had extremely low hardness, those that were compressed and molded after a lapse of two days had the hardness of approximately 7 N. The one without addition of butter resulted in extremely low hardness regardless of the neglected time. Since there is no big difference between the porosities of these compressed and molded substances, it is seen that the addition of oil helped to enhance the shape retaining attribute.

From the above-mentioned result, it is presumed that mere addition of the fat does not contribute to the increase of hardness, but the fat existing in the state of having penetrated inwards from the surface of the particle of the powdered milk with the lapse of time helps to enhance the hardness. It is to be noted that the effect of enhancing hardness was not obtained with the powdered milk having solid oil (palm hardened oil, melting point of 58° C., manufactured by Taiyo Yushi Corp.) that is waxy at room temperature added instead of the butter oil that is liquid at room temperature.

Generally, solid oil (wax) is known to have the lubricating effect for reducing friction upon compression and molding, and is used extensively for this purpose. However, when the compression and molding under low pressure is required in order to secure an interstice as in the present invention, one having both effects of adding lubricity and the enhancement of shape retaining attribute is useful. While addition of fat that is liquid at room temperature is effective, a process for the addition is added, and the powder to which the liquid fat is added loses the fluidity, thereby decreasing the mortar filling ability. Therefore, releasing the fat essentially included in the milk fat upon compression and molding required when compressing and molding the fat is extremely practical.

Embodiment 4

(Productivity Verification)

The powdered milk obtained by the manufacturing method of the reference example (including 25% by weight of fat, 58.3% by weight of sugar, 11.7% by weight of protein, mineral, water, etc.) is compressed and molded continuously for 1 hour by a single punch tabletting machine (manufactured by Okada Seiko Co., Ltd.) under conditions of compression force of 5 MPa and 20 tablets/min (1200 tablets/h). Thereafter, left in a temperature and humidity chamber (manufactured by TABAI ESPEC) under conditions of 40° C. and 95% RH for 5 minutes. Then dried with an air oven (manufactured by Yamato Scientific Co., Ltd.) at 40° C. for 30 minutes. Thus, solid milk with diameter of 25 mm and weight of approximately 4.2 g was obtained.

During 1 hour of continuous tabletting, no tabletting failure due to the sticking of powder to the mortar and pestle was observed, and the operation was not interrupted. The result of the continuous tabletting experiment is shown in Table 4. The compressed and molded substance has strength of 10 N, and there was no trouble such as losing shape upon transition to the humidifying process. The milk solid substance manufactured through the drying process had the solubility of 30 sec and less, and sufficient hardness of 92.5 N. Also, no oil off was observed, and the flavor was not different from the powdered milk used as the basic ingredient. It is to be noted that the porosity of this milk solid substance is 36.3% and the free fat is 0.54%.

TABLE 4

Continuous tabletting experiment

|  | Powdered milk as ingredient | Solid milk |
|---|---|---|
| Porosity (%) |  | 36.3 |
| Hardness before humidification (N) |  | 10.0 |
| Hardness (N) |  | 92.5 |
| Solubility (s) | 10 | 30 |
| Free fat (%) | 0.09 | 0.54 |
| Oil off (—) | □ | □ |
| Flavor (—) | 4.10 | 4.10 |

Embodiment 5

(Examination of Humidification Condition)

The powdered milk (including 25% by weight of fat, 58.3% by weight of sugar, 11.7% by weight of protein, mineral, water) is compressed and molded by a universal tester Autograph (manufactured by Shimadzu Corporation) under conditions of compression force of 5 MPa and compression speed of 10 mm/min is used as sample to examine the humidification condition The sample is left for fixed time under 80° C. and 100% RH (using Combi Oven, manufactured by FUJIMAK) or under 40° C. and 95% RH (using temperature and humidity chamber, manufactured by TABAI ESPEC). The weight of water increased by the humidification was obtained by measuring weight before and after the humidification. Thereafter, the sample was dried with an air oven (manufactured by Yamato Scientific Co., Ltd.) at 40° C. for 30 minutes and the strength was measured. The relationship between the humidification time and the strength in the embodiment 5 is shown is FIG. 3 while the relationship between the humidification amount of water and the hardness is shown in FIG. 4. Also, the relationships between the humidification time, the humidification weight (%), and the hardness (N) after the drying are respectively shown in Tables 5-1 and 5-2.

TABLE 5-1

Condition: Temperature 80° C. 100% RH

|  | Humidifying time (s) | | | | | | | | |
|---|---|---|---|---|---|---|---|---|---|
|  | 0 | 5 | 10 | 15 | 30 | 60 | 90 | 120 | 180 |
| Humidifying weight (%) | 0 | 0.5 | 0.5 | 0.8 | 1.1 | 1.5 | 2 | 2.5 | 2.8 |
| Hardness after drying (N) | 12.7 | 2.5 | 23 | 31.3 | 56.5 | 96.7 | 103 | 119 | 114 |

TABLE 5-2

Condition: Temperature 40° C. 95% RH

|  | Humidifying time (s) | | | | | | |
|---|---|---|---|---|---|---|---|
|  | 0 | 60 | 120 | 180 | 300 | 600 | 900 |
| Humidifying weight (%) | 0 | 0.5 | 0.7 | 0.9 | 1.2 | 1.6 | 1.9 |
| Hardness after drying (N) | 12.7 | 17.3 | 25 | 29.5 | 39.5 | 64.8 | 78.2 |

Figure 3:
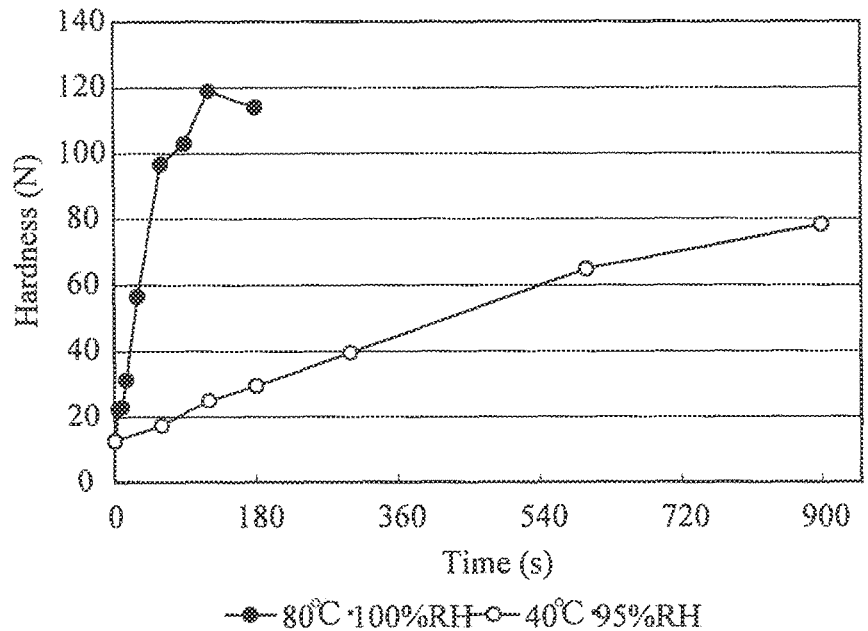
FIG. 3 is a graph showing relationship between humidification time and strength in embodiment 5.
Figure 4:
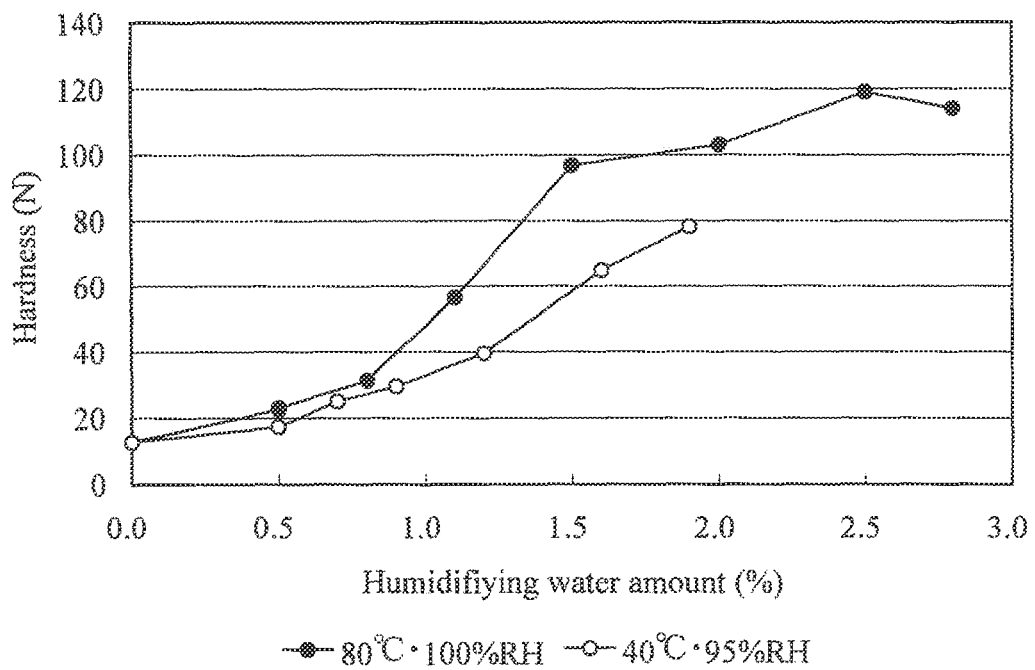
FIG. 4 is a graph showing relationship between humidifying water amount and hardness in embodiment 5.

According to FIG. 3, it is seen that the solid milk having higher strength can be obtained in short time by processing under higher temperature. Also, according to FIG. 4, it is seen that the humidification of 0.5% by weight yields the strength increasing effect. Also, the strength almost doubles with the humidification of approximately 1% by weight, so that the strength tends to increase with the increase of the humidification weight. The increase of strength stops when the humidification weight exceeds 2.5% by weight.

Embodiment 6

(Long-Term Storage Stability)

The solid milk made by the compression force of 5 MPa of the embodiment 1 and the powdered milk used as the basic ingredient are put in aluminum bags and preserved under the condition of 30° C. for three months to examine the items of the dissolution time, the hardness, the free fat, the peroxide value, the oil off, and the flavor according to the test examples. The result thereof is shown in Table 6. It is seen from Table 6 that the items of the dissolution time, the strength, the free fat, the oil off, and the flavor had no difference from the default values. As for the peroxide value, the solid milk showed comparable value with that of the powdered milk used as the basic ingredient. Thus, the milk solid substance made by the method of the present invention has excellent long-term storage stability.

TABLE 6

Long-term storage stability at 30° C.

|  | Solid milk | | Powdered milk (ingredient) | |
|---|---|---|---|---|
| Examined item | start | 3 months later | start | 3 months later |
| Free fat (%) | 1.26 | 1.39 | 0.54 | 0.59 |
| Peroxide value (meq/kg) | 0.08 | 0.95 | 0.12 | 0.78 |
| Oil off (—) | ± | ± | ± | ± |
| Flavor (—) | 4.08 | 4.09 | 4.00 | 3.91 |
| Dissolution time (s) | 30 | 30 |  |  |
| Hardness (N) | 42 | 43 |  |  |

Embodiment 7

(Examination of Solid Milk Physicality with Tabletting Machine)

By using the basic ingredients which will be described later, how the solid milk obtained is influenced by the compression force in the compression process and the humidifying time in the humidifying step on the physicality (especially the relationship between the porosity and strength or the dissolution time) is examined. The composition of the basic ingredient is; 25.9% of fat, 11.8% of protein, 57.2% of carbohydrate, 2.3% of ash, and 2.8% of water. It is to be noted that the solid milk manufactured is column-shaped whose diameter is 30 mm, and the weight per particle is made 5 g. Also, as the compression molding machine, a single punch tabletting machine (manufactured by Okada Seiko Co., Ltd.) is used with the compression speed of 10 mm/s. If not otherwise specified, the humidifying process is at 60° C. and 96% RH for 3 minutes. It is to be noted that in some cases, the humidifying time was made 4 minutes or 5 minutes. Also, the drying process is at 80° C. for 5 minutes. The result thereof is shown in Table 7. From Table 7, it is seen that the smaller the compression three, the lesser the free fat, and the strength of the obtained solid milk decreased, but the porosity increases. It is also seen that when the solid milk is manufactured with a low compression force (e.g. 0.14 MPa-4.95 MPa, especially 0.14 MPa-1.34 MPa) the solid milk having high porosity but maintaining certain level of strength can be obtained. Moreover, it is seen that by keeping the humidifying time within predetermined range, the strength of the obtained solid milk increases. In the embodiment 7, the dissolution time of the solid milk is 60 sec when the target porosity is 30%, 20 sec when the target porosity is 40%, and 10 sec when the target porosity is 50% or more. The dissolution time of the solid milk could be remarkably shortened when the compression speed is made equal to or lower than 10 mm/s. In order to obtain solid milk with the porosity more than 50% and less than 60%, it is considered that the compression force is only to be controlled to approximately 0.1 MPa-0.3 MPa.

speed and the free fat. FIG. 5C is a graph showing the relationship between the strength and the free fat of the solid milk. It is seen from FIG. 5A that even if the porosity is the same, the smaller the compression speed, the solid milk with higher strength can be obtained. It is seen from FIG. 5B that by controlling the compression speed, the amount of the free fat can be controlled. It is seen from FIG. 5C that the strength and the free fat are correlated. Accordingly, it can be said that even with the solid milk of the same porosity, in order to increase the strength, it is effective to reduce the compression speed and intentionally generate the free fat. Specifically speaking, it is seen that in order to increase the strength of the solid milk, it is only necessary to make the compression speed e.g. 0.1 mm/s-100 mm/s, preferably 1 mm/s-80 mm/s, and more preferably 2 mm/s-60 mm/s. Moreover, while controlling the amount of the free fat is an important factor for the solid milk of the present invention, especially for the solid milk with porosity of 50% or less, the amount of the free fat can be effectively increased by controlling the compression speed equal to or below 40 mm/s.

Embodiment 9

(Influence of Compression Speed on Strength of Solid Milk, Column-Shaped Solid Milk)

In order to examine the influence of the compression speed on the obtained solid milk, the solid milk was made by changing the compression speed. Namely, by using a

TABLE 7

Relationship between porosity and physicality

| | Target porosity [%] | | | | | | | | |
|---|---|---|---|---|---|---|---|---|---|
| | 30 | 35 | 40 | 45 | 50 | 55 | 55[1] | 60 | 60[2] |
| Compression force [MPa] | 10.62 | 7.08 | 4.95 | 2.56 | 1.34 | 0.35 | 0.35 | 0.14 | 0.14 |
| Porosity [%] | 29.6 | 35.8 | 39.4 | 44.1 | 48.8 | 54.0 | 53.9 | 58.0 | 57.2 |
| Free fat [%] | 3.00 | 2.22 | 1.68 | 1.17 | 0.91 | 0.75 | 0.75 | 0.73 | 0.73 |
| Hardness before hardening [N] | 51.3 | 29.8 | 18.6 | 8.6 | 3.7 | 1.1 | 1.1 | | |
| Hardness [N] | 265.2 | 196.1 | 133.3 | 65.3 | 37.7 | 21.0 | 30.0 | 16.4 | 20.2 |
| Dissolution time [s] | 60 | 30 | 20 | 15 | 10 | 10 | 10 | 10 | 10 |

[1]Hardening condition: humidifying time of 4 min
[2]Hardening condition: humidifying time of 5 min Embodiment 8

(Influence of Compression Speed on Strength of Solid Milk, Quadrangular Prism-Shaped Solid Milk)

In order to examine the influence of the compression speed on the obtained solid milk, the solid milk was made by changing the compression speed. Namely, by using a single punch tabletting machine (manufactured by Okada Seiko Co., Ltd.) under conditions various compression speeds, the quadrangular prism-shaped solid milk (22 mm×35 mm×10 mm) is obtained. The composition of the basic ingredient is; 25.9% of fat, 11.8% of protein, 57.2% of carbohydrate, 2.3% of ash, and 2.8% of water. It is to be noted that adjustments were made so that the porosity of the obtained solid milk assume approximately 45%, 50%, and 55%.

Figure 5A:
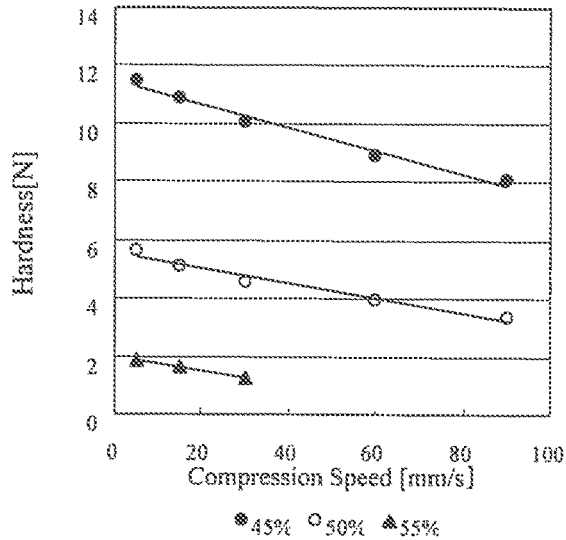
FIGS. 5A-5C are graphs showing physicality of solid milk obtained by an embodiment 8.
Figure 5B:
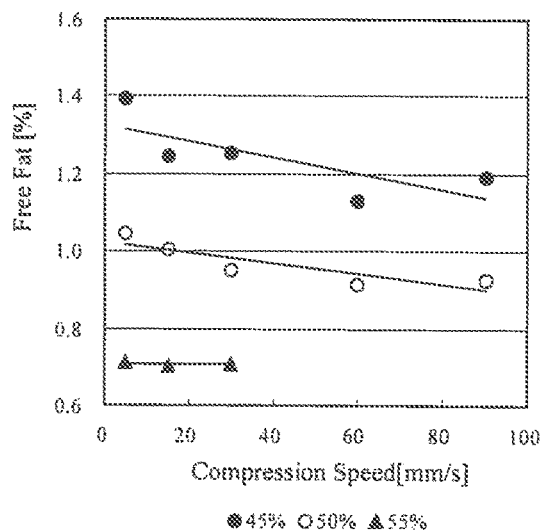
Figure 5C:
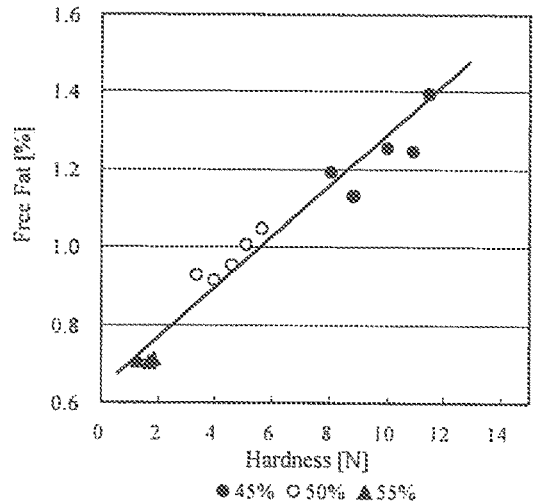

FIGS. 5A-5C are graphs showing the physicality of the solid milk obtained by the embodiment 8. FIG. 5A is a graph showing the relationship between the compression speed and the strength of the obtained solid milk, FIG. 5B is a graph showing the relationship between the compression single punch tabletting machine (manufactured by Okada Seiko Co., Ltd.) under conditions various compression speeds, the column-shaped solid milk (diameter of 30 mm×10 mm) is obtained. The composition of the basic ingredient is; 18% of fat, 15% of protein, 60.1% of carbohydrate, 4.1% of ash, and 2.8% of water. It is to be noted that adjustments were made so that the porosity of the obtained solid milk assume approximately 45%, 50%, and 55%.

Figure 6A:
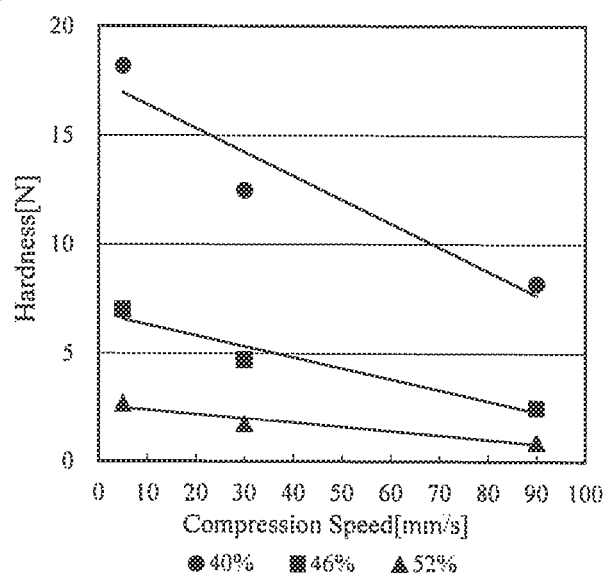
FIGS. 6A and 6B are graphs showing physicality of solid milk obtained by an embodiment 9.
Figure 6B:
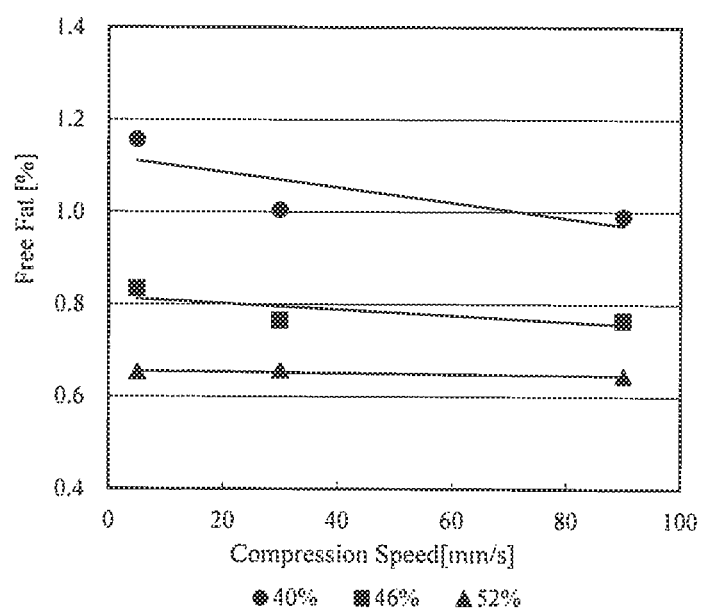

FIGS. 6A and 6B are graphs showing the physicality of the solid milk obtained by the embodiment 9. FIG. 6A is a graph showing the relationship between the compression speed and the strength of the obtained solid milk. FIG. 6B is a graph showing the relationship between the compression speed and the free fat. It is seen from FIG. 6A that even if the porosity is the same, the smaller the compression speed, the solid milk with higher strength can be obtained. It is seen from FIG. 6B that by controlling the compression speed, the amount of the free fat can be controlled. Accordingly, it can be said that even with the solid milk of the same porosity, in order to increase the strength, it is effective to reduce the compression speed and intentionally generate the free fat. Specifically speaking, it is seen that in order to increase the strength of the solid milk, it is only necessary to make the compression speed e.g. 0.1 mm/s-100 mm/s, preferably 1 mm/s-80 mm/s, and more preferably 2 mm/s-60 mm/s. Under the conditions of the embodiment 9, especially for the case where the porosity is 45% or below (specifically the case where the porosity is 40%), the strength is remarkably increased by making the compression speed 10 mm/s-30 mm/s. Moreover, while controlling the amount of the free fat is an important factor for the solid milk of the present invention, especially for the solid milk with porosity of 50% or less, the amount of the free fat can be effectively increased by controlling the compression speed equal to or below 40 mm/s.

Embodiment 10

Figure 7:
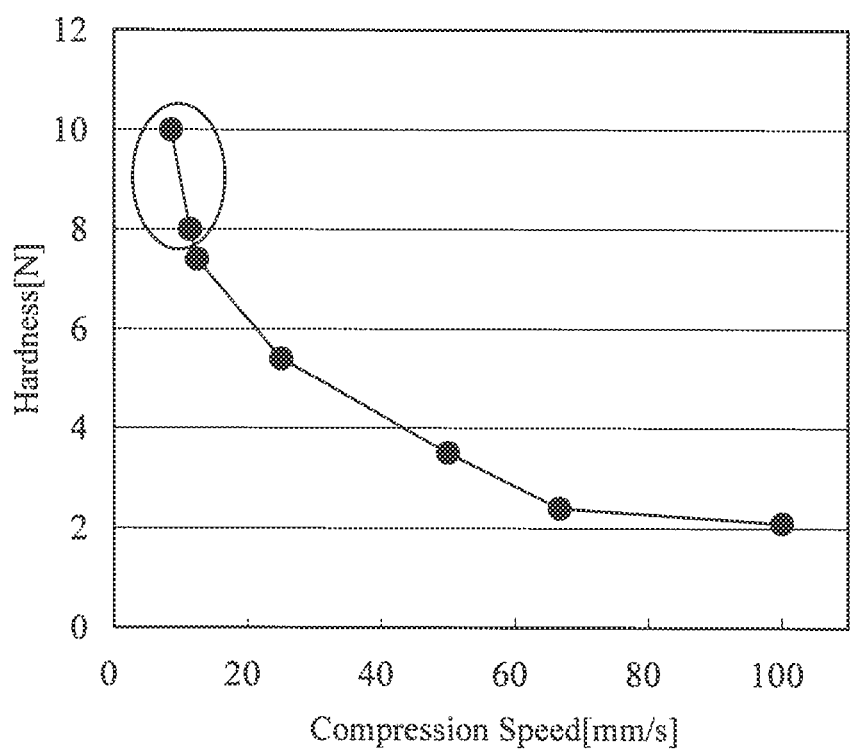
FIG. 7 is a graph showing physicality of solid milk obtained by embodiment 10.

In this embodiment, a rotary tabletting machine (manufactured by Kikusui Seisakusho Ltd.) is used to examine the relationship between the compression speed and the strength of the solid milk obtained. The composition of the basic ingredient is; 25.9% of fat, 11.8% of protein, 57.2% of carbohydrate, 2.3% of ash, and 2.8% of water. The compression speed was adjusted by changing the rotational frequency of the rotary tabletting machine. FIG. 7 shows the relationship between the compression speed and the strength of the solid milk when the porosity of the solid milk is made 43%. From FIG. 7, it is seen that in the same way as in the embodiment 8 and embodiment 9, the smaller the compression speed, the solid milk with the higher strength can be obtained. In order to reduce the compression speed in the rotary tabletting machine, the rotational frequency is required to be reduced, so that the manufacturing capacity is decreased. Therefore, pressure rollers for upper and lower pestles of the rotary tabletting machine are removed and linear tracks of 15 cm in length (pressure rails) are provided therein to sandwich the upper and lower pestles. The rail on the side of the lower pestle is provided with a lean of 0.82°. It is structured that when the lower pestle passes between the rails, the lower pestle rises 2 mm, thereby enabling a slow compression and molding. By using these pressure rails, it is made possible to slow down the compression speed without reducing the rotational frequency and to increase the strength of the solid milk. The solid milk is obtained by using this pressure rails to make the rotational frequency 30 rpm and 40 rpm. The relationship between the compression speed and the strength of the solid milk obtained by using these pressure rails is shown as two points in the area enclosed in a circle in FIG. 7.

Embodiment 11

(Influence of Compression Speed and Compression Retention Time on Porosity and Strength of Solid Milk)

In this embodiment, the compression speed, the compression retention time (time to retain the maximum compression displacement) as well as the porosity and the hardness of the obtained solid milk are examined. The composition of the basic ingredient is; 25.9% of fat, 11.8% of protein, 57.2% of carbohydrate, 2.3% of ash, and 2.8% of water. It is to be noted that the manufactured solid milk is quadrangular prism-shaped (22 mm×35 mm×12 mm) and the weight per particle is made 5.5 g. Also, the compression and molding machine used has features such as a hydraulic cylinder driven type, capable of setting displacement of upper and lower pestles, capable of changing compression speed, capable of setting compression retention time. In the compression process, a predetermined basic ingredient is put in the mortar, preliminarily compressed with the upper pestle, then compressed and molded by fixing the displacement of the lower pestle to 4 mm, while adjusting the porosity by the displacement of the upper pestle. The humidification process was performed at 60° C. and 96% RH to be held for 3 minutes. The drying process was performed at 80° C. to be held for 5 minutes. The result thereof is shown in Table 8. In Table 8, the total time is the sum of the compression time and the holding time. It is seen that when there is no compression retention time, the smaller the compression speed gets, the larger the hardness of the solid milk gets. In the cases where the compression retention time is set, in each compression speed, as the compression retention time increases, the porosity of the solid milk is decreased while the hardness is increased. Each of the hardening treated result of the foregoing achieved the predetermined hardness and the dissolution time. Accordingly, it is seen that by appropriately combining the compression speed and the compression retention time, the total time for the compression molding, the porosity and the hardness of the solid milk can be controlled.

TABLE 8

Relationship between compression condition and physicality of solid milk

| Compression condition | | | | | Before hardening | | After hardening | | | |
|---|---|---|---|---|---|---|---|---|---|---|
| Displacement of upper pestle (mm) | Compression speed (mm/s) | Compression time (s) | Retention time (s) | Total time (s) | Porosity (%) | Hardness (N) | Porosity (%) | Hardness (N) | Dissolution time (s) | Free fat (%) |
| 4.0 | 3.6 | 1.1 | 0.0 | 1.1 | 52.9 | 1.2 | 53.3 | 26.4 | 15 | 0.80 |
| | | | 0.3 | 1.4 | 51.3 | 2.0 | 50.7 | 36.2 | 15 | 0.85 |
| | | | 1.0 | 2.1 | 50.9 | 2.7 | | | | |
| | 6.0 | 0.7 | 0.0 | 0.7 | 52.4 | 1.0 | 52.4 | 30.4 | 15 | 0.77 |
| | | | 0.1 | 0.8 | 51.3 | 1.7 | 50.2 | 40.9 | 15 | 0.86 |
| | | | 0.3 | 1.0 | 50.8 | 2.1 | 50.0 | 37.8 | 15 | 0.89 |
| | | | 0.5 | 1.2 | 50.8 | 2.6 | | | | |
| | | | 1.0 | 1.7 | 50.6 | 2.8 | 50.0 | 35.7 | 15 | 0.89 |
| | | | 2.0 | 2.7 | 50.4 | 3.0 | | | | |
| | 13.3 | 0.3 | 0.3 | 0.6 | 50.6 | 2.1 | | | | |
| | | | 0.7 | 1.0 | 50.5 | 2.4 | | | | |
| | 36.4 | 0.1 | 0.0 | 0.1 | 50.8 | nd | | | | |
| | | | 0.3 | 0.4 | 50.5 | 0.9 | | | | |
| | | | 1.0 | 1.1 | 50.2 | 1.1 | | | | |

TABLE 8-continued

Relationship between compression condition and physicality of solid milk

| Compression condition | | | | | Before hardening | | After hardening | | Dissolution time (s) | Free fat (%) |
|---|---|---|---|---|---|---|---|---|---|---|
| Displacement of upper pestle (mm) | Compression speed (mm/s) | Compression time (s) | Retention time (s) | Total time (s) | Porosity (%) | Hardness (N) | Porosity (%) | Hardness (N) | | |
| 6.0 | 9.1 | 0.4 | 0.0 | 0.4 | 46.4 | 5.4 | 45.7 | 62 | 20 | 1.11 |
| | | | 0.1 | 0.5 | 46.0 | 6.3 | | | | |
| | | | 0.3 | 0.7 | 45.8 | 6.6 | 45.2 | 63.9 | 20 | 1.08 |
| | | | 1.0 | 1.4 | 45.8 | 7.2 | | | | | nd: rupture point undetectable

Embodiment 12

(Relationship Between Volume of Solid Milk and Hardness or Dissolution Time)

In this embodiment, solid milk with various volumes is manufactured by a single punch tabletting machine (manufactured by Okada Seiko Co., Ltd.). The relationship between the shape, the volume, the hardness, and the dissolution time is shown in Table 9. The composition of the basic ingredient is; 18% of fat, 15% of protein, 60.1% of carbohydrate, 4.1% of ash, and 2.8% of water. It is seen from Table 9 that the solid milk having the porosity of the present invention accomplishes the predetermined strength and the dissolution time even if the shape or the volume differs.

TABLE 9

Relationship between volume and physicality of solid milk

| Shape | Weight [g] | Thickness [mm] | Volume [cm³] | Porosity [%] | Hardness [N] | Dissolution time [s] |
|---|---|---|---|---|---|---|
| column-shaped (diameter 15 mm) | 1.025 | 9.50 | 1.7 | 51.1 | 34.7 | 10 |
| column-shaped (diameter 30 mm) | 5.100 | 11.80 | 8.3 | 51.1 | 39.6 | 15 |
| column-shaped (diameter 30 mm) | 7.547 | 17.56 | 12.4 | 51.3 | 41.2 | 20 |
| cubic-shaped (24 × 34 mm) | 9.977 | 20.32 | 16.6 | 51.9 | 56.2 | 20 |

The solid milk of the present invention when actually manufactured, is found to be suitable to be manufactured and marketed as commercial products, the solid milk and the method of making the same according to the present invention can be used in the foods industry such as alternative for the powdered milk and the method of making the same.

The invention claimed is:

1. A method of making solid milk, comprising:
compressing powdered milk to obtain a solid form of compressed powdered milk;
humidifying the compressed powdered milk obtained by the compressing; and
drying the compressed powdered milk humidified by the humidifying, wherein the compressing is performed by using a compression molding machine that compresses the powdered milk, with a compression speed of 0.1 mm/s to 100 mm/s and a compression force of 50 KPa to 30 MPa.

2. The method according to claim 1, wherein the compression speed is 0.1 mm/s to 40 mm/s.

3. The method according to claim 1, wherein the compression speed is 3 mm/s to 10 mm/s.

4. The method according to claim 1, rein a retention time in the compressing is 0.1 second to 1 minute.

5. The method according to claim 1, wherein the powdered milk comprises 0.5 wt % to 3 wt % of free fat.

6. The method according to claim 1, wherein the humidifying is performed by placing the compressed powdered milk in an environment of 60% RH to 80% RH for 5 seconds to 1 hour.

7. The method according to claim 1, wherein an amount of moisture added w the compressed powdered milk by the humidifying is 0.5 wt % to 3 wt % of the compressed powdered milk.

* * * * *